US 12,444,747 B2

(12) United States Patent
Matsuo et al.

(10) Patent No.: US 12,444,747 B2
(45) Date of Patent: Oct. 14, 2025

(54) METHOD OF PRODUCING NON-AQUEOUS ELECTROLYTE SECONDARY BATTERY, AND NEGATIVE ELECTRODE ACTIVE MATERIAL

(71) Applicant: PRIME PLANET ENERGY & SOLUTIONS, INC., Tokyo (JP)

(72) Inventors: Yuta Matsuo, Kobe (JP); Kaori Ishikawa, Nishinomiya (JP); Kunihiko Hayashi, Miki (JP); Masumi Terauchi, Koriyama (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 667 days.

(21) Appl. No.: 17/679,607

(22) Filed: Feb. 24, 2022

(65) Prior Publication Data

US 2022/0293943 A1 Sep. 15, 2022

(30) Foreign Application Priority Data

Mar. 10, 2021 (JP) .................. 2021-038258

(51) Int. Cl.
*H01M 4/587* (2010.01)
*H01M 4/02* (2006.01)
(52) U.S. Cl.
CPC ...... *H01M 4/587* (2013.01); *H01M 2004/021* (2013.01); *H01M 2004/027* (2013.01)
(58) Field of Classification Search
CPC ........ H01M 4/587; H01M 4/364; H01M 4/48; H01M 4/64; H01M 10/525
See application file for complete search history.

(56) References Cited

U.S. PATENT DOCUMENTS

2004/0170898 A1 9/2004 Shibuya et al.
2009/0311599 A1* 12/2009 Kawai .................. H01M 4/133
29/623.5

(Continued)

FOREIGN PATENT DOCUMENTS

CN 106463727 A 2/2017
CN 109075324 A 12/2018

(Continued)

OTHER PUBLICATIONS

CN112038610A Translated (Year: 2020).*
WO2020012586A1 Translated (Year: 2020).*
JP2001319651A Translated (Year: 2001).*

*Primary Examiner* — Jennifer Dieterle
(74) *Attorney, Agent, or Firm* — Finnegan, Henderson, Farabow, Garrett, and Dunner, LLP

(57) ABSTRACT

A negative electrode active material is prepared by mixing a first graphite particle and a second graphite particle. A negative electrode including the negative electrode active material is produced. A non-aqueous electrolyte secondary battery including the negative electrode, a positive electrode, and an electrolyte solution is produced. The first graphite particle has a first number-based particle size distribution. The second graphite particle has a second number-based particle size distribution. A relationship of "$D_2 50/D_1 50 \leq 0.50$" is satisfied. $D_1 50$ is a D50 in the first number-based particle size distribution. $D_2 50$ is a D50 in the second number-based particle size distribution. A relationship of "$R_2 \leq R_1$" is satisfied. $R_1$ is an arithmetic mean of circularity of the first graphite particle. $R_2$ is an arithmetic mean of circularity of the second graphite particle.

9 Claims, 2 Drawing Sheets

(56) References Cited

U.S. PATENT DOCUMENTS

| | | | | |
|---|---|---|---|---|
| 2013/0302675 A1* | 11/2013 | Kouzu | ............... | H01M 4/364 |
| | | | | 252/502 |
| 2015/0270540 A1* | 9/2015 | Kouzu | ............... | H01M 4/364 |
| | | | | 252/502 |
| 2017/0179487 A1* | 6/2017 | Takeda | ............... | C01B 32/20 |
| 2019/0237763 A1* | 8/2019 | Wakizaka | ............ | H01M 4/587 |
| 2020/0235406 A1* | 7/2020 | Lee | ..................... | H01M 4/583 |
| 2021/0273224 A1 | 9/2021 | Hoshi et al. | | |

FOREIGN PATENT DOCUMENTS

| | | | |
|---|---|---|---|
| CN | 112038610 A | * | 12/2020 |
| JP | 2000-226206 A | | 8/2000 |
| JP | 2001319651 A | * | 11/2001 |
| JP | 2003-323895 A | | 11/2003 |
| JP | 2004-111109 A | | 4/2004 |
| JP | 2013-197082 A | | 9/2013 |
| JP | WO2014/024473 A1 | | 2/2014 |
| JP | 2015-082381 A | | 4/2015 |
| JP | 2017-091886 A | | 5/2017 |
| WO | WO 2020/012587 A1 | | 1/2020 |
| WO | WO-2020012586 A1 | * | 1/2020 |
| WO | WO 2021/005689 A1 | | 1/2021 |

* cited by examiner

METHOD OF PRODUCING NON-AQUEOUS ELECTROLYTE SECONDARY BATTERY, AND NEGATIVE ELECTRODE ACTIVE MATERIAL

This nonprovisional application is based on Japanese Patent Application No. 2021-038258 filed on Mar. 10, 2021, with the Japan Patent Office, the entire contents of which are hereby incorporated by reference.

BACKGROUND OF THE INVENTION

Field of the Invention

The present technique relates to a method of producing a non-aqueous electrolyte secondary battery, and a negative electrode active material.

Description of the Background Art

Japanese Patent Laying-Open No 2013-197082 discloses a carbon material for a battery including spheroidized graphite.

SUMMARY OF THE INVENTION

As a negative electrode active material for a non-aqueous electrolyte secondary battery (which may be simply called "battery" hereinafter), spheroidized graphite particles have been developed. Spheroidized graphite particles have an outer shape that is, literally, close to spherical. As an index of spheroidizing, the circularity of the particle in an image is used, for example.

Spheroidized graphite particles have good packing properties. When spheroidized graphite particles are used, energy density and/or the like is expected to be enhanced, for example. Further, spheroidized graphite particles are less likely to collapse. Generally, a negative electrode of a battery is subjected to compression processing. When particles are less likely to collapse during the compression, pores are likely to be formed inside the negative electrode. Into the pores, electrolyte solution may permeate. Thus, when the pores are formed, input-output properties are expected to be enhanced, for example. If the particles collapse, active surfaces (edge faces) of graphite are exposed, which may impair storage properties. With the particles being less likely to collapse, storage properties are also expected to be enhanced.

However, spheroidized graphite particles have room for improvement in cycle endurance. More specifically, in a negative electrode including spheroidized graphite particles, these particles tend to come into contact with each other in points. As charge and discharge proceed, the particles repeatedly expand and shrink. As the particles thus change their volume, the contact points between the particles may be lost. The loss of contact points between the particles seems to cause discontinuity of conductive paths. This seems to cause a decrease in capacity retention.

For example, use of conductive material (such as carbon black) is considered as a means for forming conductive paths. However, conductive material does not substantially contribute to battery capacity. Addition of conductive material to a negative electrode may decrease energy density of the battery.

An object of the technique according to the present application (herein also called "the present technique") is to improve cycle endurance.

Hereinafter, the configuration and effects of the present technique will be described. It should be noted that the action mechanism according to the present specification includes presumption. The action mechanism does not limit the scope of the present technique.

[1] A method of producing a non-aqueous electrolyte secondary battery comprises the following (A), (B), and (C):

(A) preparing a negative electrode active material by mixing a first graphite particle and a second graphite particle;

(B) producing a negative electrode including the negative electrode active material; and (C) producing a non-aqueous electrolyte secondary battery including the negative electrode, a positive electrode, and an electrolyte solution.

The first graphite particle has a first number-based particle size distribution. The second graphite particle has a second number-based particle size distribution.

A relationship of the following expression (I):

$$D_2 50/D_1 50 \leq 0.50 \tag{I}$$

is satisfied, where $D_1 50$ is a D50 in the first number-based particle size distribution, and $D_2 50$ is a D50 in the second number-based particle size distribution.

Further, a relationship of the following expression (II):

$$R_2 \leq R_1 \tag{II}$$

is satisfied, where $R_1$ is an arithmetic mean of circularity of the first graphite particle, and $R_2$ is an arithmetic mean of circularity of the second graphite particle.

The negative electrode active material according to the present technique includes a first graphite particle and a second graphite particle. The second graphite particle is, in other words, a small particle. As seen in the above expression (I), the D50 of the second graphite particle is ½ or less the D50 of the first graphite particle. It is expected that the second graphite particles enter into the gaps between the first graphite particles and thereby conductive paths are formed. Unlike typical conductive materials (such as carbon black), the second graphite particle may be able to contribute to battery capacity.

Further, as seen in the above expression (II), the arithmetic mean of circularity (hereinafter also called "average circularity") of the first graphite particle and that of the second graphite particle satisfy a particular relationship. More specifically, the average circularity of the small particle ($R_2$) is equal to or less than the average circularity of a large particle ($R_1$). As charge and discharge proceed, the small particles also expand and shrink repeatedly. As the small particles thus change their volume, the contact points between the small particles and the large particles may be lost. According to new findings from the present technique, when the average circularity of the small particle ($R_2$) is equal to or less than the average circularity of the large particle ($R_1$), the contact points between the small particles and the large particles are less likely to be lost.

Thus, in the battery according to the present technique, cycle endurance is expected to be improved.

[2] Relationships of the following expressions (III) and (IV):

$$0.945 \leq R_1 \tag{III}$$

$$0.90 \leq R_2 < R_1 \tag{IV}$$

may be satisfied.

When the relationships of the above expressions (III) and (IV) are further satisfied, cycle endurance is expected to be improved.

[3] A relationship of the following expression (V):

$$0.05 \leq M_2/M_1 \leq 0.10 \quad (V)$$

may be satisfied, where $M_1$ is a mass of the first graphite particle included in the negative electrode active material, and $M_2$ is a mass of the second graphite particle included in the negative electrode active material.

When the relationship of the above expression (V) is further satisfied, cycle endurance is expected to be improved.

[4] A relationship of the following expression (VI):

$$0.70 \leq (D_1 90 - D_1 10)/D_1 50 \leq 0.80 \quad (VI)$$

may be satisfied, where $D_1 10$ is a D10 in the first number-based particle size distribution, and $D_1 90$ is a D90 in the first number-based particle size distribution.

Further, a relationship of the following expression (VII):

$$0.97 \leq (D_2 90 - D_2 10)/D_2 50 \quad (VII)$$

may be satisfied, where $D_2 10$ is a D10 in the second number-based particle size distribution, and $D_2 90$ is a D90 in the second number-based particle size distribution.

"(D90−D10)D50" is also called "span value" and the like, for example. The span value is an index of the spreading of the particle size distribution. The smaller the span value is, the sharper the particle size distribution seems to be. When the relationships of the above expressions (VI) and (VII) are further satisfied, cycle endurance is expected to be improved.

[5] A standard deviation of circularity of the second graphite particle may be 0.08 or more.

When the standard deviation of circularity of the second graphite particle is 0.08 or more, cycle endurance is expected to be improved. It may be because, when the circularity of the small particle varies to a certain degree, the contact points between the small particles and the large particles are less likely to be lost.

[6] The negative electrode active material has a third number-based particle size distribution.

A relationship of the following expression (VIII):

$$0.87 \leq (D_3 90 - D_3 10)/D_3 50 \leq 0.99 \quad (VIII)$$

may be satisfied, where $D_3 10$ is a D10 in the third number-based particle size distribution, $D_3 50$ is a D50 in the third number-based particle size distribution, and $D_3 90$ is a D90 in the third number-based particle size distribution.

The negative electrode active material is a mixture of the first graphite particle and the second graphite particle. When the first graphite particle and the second graphite particle are mixed in such a manner that the relationship of the above expression (VIII) is satisfied, cycle endurance is expected to be improved.

[7] The negative electrode active material is used for a non-aqueous electrolyte secondary battery. The negative electrode active material includes a first graphite particle and a second graphite particle. The first graphite particle has a first number-based particle size distribution. The second graphite particle has a second number-based particle size distribution.

A relationship of the following expression (I):

$$D_2 50/D_1 50 \leq 0.50 \quad (I)$$

is satisfied, where $D_1 50$ is a D50 in the first number-based particle size distribution, and $D_2 50$ is a D50 in the second number-based particle size distribution.

Further, a relationship of the following expression (II):

$$R_2 \leq R_1 \quad (II)$$

is satisfied, where $R_1$ is an arithmetic mean of circularity of the first graphite particle, and $R_2$ is an arithmetic mean of circularity of the second graphite particle.

The foregoing and other objects, features, aspects and advantages of the present technique will become more apparent from the following detailed description of the present technique when taken in conjunction with the accompanying drawings.

DESCRIPTION OF THE PREFERRED EMBODIMENTS

Figure 1:
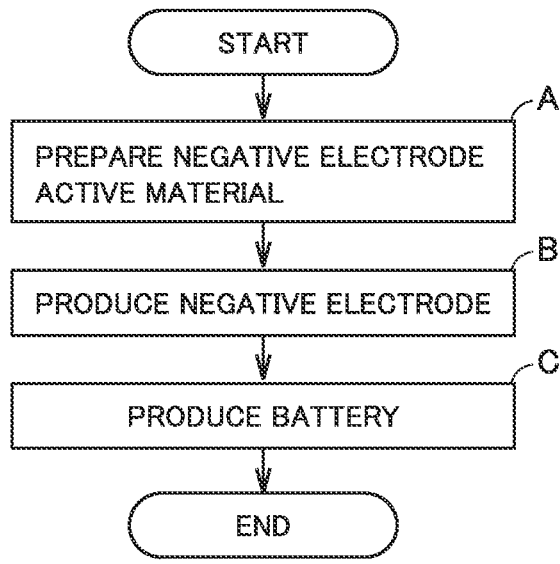
FIG. 1 is a schematic flowchart illustrating a method of producing a non-aqueous electrolyte secondary battery according to the present embodiment.

Next, an embodiment of the present technique (herein also called "the present embodiment") will be described. It should be noted that the below description does not limit the scope of the present technique. For example, when functions and effects are mentioned herein, it does not limit the scope of the present technique to a certain configuration or configurations where all these functions and effects are exhibited.

Definitions of Terms, Etc

Herein, expressions such as "comprise", "include", and "have", and other similar expressions (such as "be composed of", "encompass, involve", "contain", "carry, support", and "hold", for example) are open-ended expressions. In an open-ended expression, in addition to an essential component, an additional component may or may not be further included. The expression "consist of" is a closed-end expression. The expression "consist essentially of" is a semiclosed-end expression. In a semiclosed-end expression, an additional component may further be included in addition to an essential component, unless an object of the present technique is impaired. For example, a component that is usually expected to be included in the relevant field to which the present technique pertains (such as inevitable impurities, for example) may also be included as an additional component.

Herein, expressions "may" and "can" are not intended to mean "must" (obligation) but rather mean "there is a possibility" (tolerance).

Herein, a singular form (a, an, the) also includes its plural meaning, unless otherwise specified. For example, "a particle" may include not only "one particle" but also "a group of particles (powder, particles)".

Herein, the order for implementing two or more steps, operations, processes, and the like included in a method is not particularly limited to the described order, unless otherwise specified. For example, two or more steps may proceed simultaneously.

Herein, a numerical range such as "from 1% to 10%" and "1-10%" includes both the upper limit and the lower limit, unless otherwise specified. That is, "from 1% to 10%" and "1-10%" mean a numerical range of "not less than 1% and not more than 10%". Moreover, any numerical value selected from a certain numerical range may be used as a new upper limit and/or a new lower limit. For example, any numerical value from a certain numerical range may be combined with any numerical value described in another location of the present specification or in a table or a drawing, for example, to create a new numerical range.

Herein, all the numerical values are modified by the term "about". The term "about" may mean ±5%, ±3%, ±1%, and/or the like, for example. Each numerical value is an approximate value that can vary depending on the implementation configuration of the present technique. Each numerical value is expressed in significant figures. Each of the measured values and the like may be rounded off in consideration of the number of the significant figures. Each numerical value may include an error occurring due to an identification limit, for example.

Herein, when a compound is represented by a stoichiometric composition formula such as "$LiCoO_2$", for example, this stoichiometric composition formula is merely a typical example. Alternatively, the composition ratio may be non-stoichiometric. For example, when lithium cobalt oxide is represented as "$LiCoO_2$", the composition ratio of lithium cobalt oxide is not limited to "Li/Co/O=1/1/2" but Li, Co, and O may be included in any composition ratio, unless otherwise specified. Further, doping with a trace element and/or substitution is also tolerated.

Any geometric term herein (such as "vertical", for example) should not be interpreted solely in its exact meaning. For example, "vertical" may mean a geometric state that is deviated, to some extent, from exact "vertical". Any geometric term herein may include tolerances and/or errors in terms of design, operation, production, and/or the like. The dimensional relationship in each figure may not necessarily coincide with the actual dimensional relationship. The dimensional relationship (in length, width, thickness, and the like) in each figure may have been changed for the purpose of assisting the understanding of the present technique. Further, a part of a configuration may have been omitted.

Herein, "at least one of a first graphite particle and a second graphite particle" may be collectively called "graphite particle(s)". A "ratio of the D50 of a second graphite particle to the D50 of a first graphite particle" is also called "particle size ratio". An "arithmetic mean of circularity" is also called "average circularity". A "ratio of the mass of a second graphite particle to the mass of a first graphite particle" is also called "blending ratio". "First number-based particle size distribution" is also called "first particle size distribution", for example.

Regarding the "particle size distribution" herein, "D10", "D50", and "D90" are defined as follows. D10 refers to a particle size in number-based particle size distribution at which cumulative frequency accumulated from the small particle size side reaches 10%. D50 refers to a particle size in number-based particle size distribution at which cumulative frequency accumulated from the small particle size side reaches 50%. D90 refers to a particle size in number-based particle size distribution at which cumulative frequency accumulated from the small particle size side reaches 90%.

Herein, volume-based particle size distribution is converted into number-based particle size distribution. The volume-based particle size distribution may be measured with a laser-diffraction particle size distribution analyzer. The measurement procedure may be as follows. A measurement target (graphite particles) is prepared. The measurement target, a dispersant, and a dispersion medium are mixed to prepare a measurement sample (a particle dispersion). The dispersant may be a product under the trade name "Triton X-100". The dispersion medium is ion-exchanged water. The measurement sample may be introduced into a laser-diffraction particle size distribution analyzer, and thereby the volume-based particle size distribution is measured.

The "circularity" herein is determined by the following equation (IX):

$$R = L_0/L \qquad (IX)$$

In the above equation (IX), "R" is circularity, "$L_0$" is the circumference of a circle that has the same area as the particle in the image, and "L" is the circumference of the particle in the image. A perfect circle has a circularity of 1.

An image of the particle may be captured with a flow-type particle image analyzer. For example, a wet-flow-type particle size and shape analyzer with the model name "FPIA-3000" manufactured by Sysmex Corporation, and/or the like may be used. The measurement procedure may be as follows. A measurement target (graphite particles) is prepared. The measurement target, a dispersant, and a dispersion medium are mixed to prepare a measurement sample (a particle dispersion). The measurement sample is fed into a flow cell of the flow-type particle image analyzer. Images of the measurement sample passing through the flow cell are captured with the use of a stroboscope and an optical microscope. The particle images are analyzed to determine the circularity of individual particles. The detection range is from 0.25 to 100 µm. The arithmetic mean of circularity of 100 or more particles is regarded as "the arithmetic mean of circularity (the average circularity)". Further, from the circularity of these 100 or more particles, the standard deviation is determined.

<Method of Producing Non-Aqueous Electrolyte Secondary Battery>

FIG. 1 is a schematic flowchart illustrating a method of producing a non-aqueous electrolyte secondary battery according to the present embodiment. The method of producing a non-aqueous electrolyte secondary battery according to the present embodiment (hereinafter also called "the present production method") includes "(A) preparing a negative electrode active material", "(B) producing a negative electrode", and "(C) producing a battery".

«(A) Preparing Negative Electrode Active Material»

The present production method includes preparing a negative electrode active material by mixing a first graphite particle and a second graphite particle. In the present production method, a powder mixer may be optionally used. In the present production method, dry mixing may be carried out or wet mixing may be carried out.

(Blending Ratio)

The second graphite particle and the first graphite particle are mixed in a predetermined blending ratio. The "blending ratio" according to the present embodiment is the ratio of the mass of the second graphite particle ($M_2$) to the mass of the first graphite particle ($M_1$) ($M_2/M_1$). The blending ratio may be from 0.025 to 0.125, for example. The blending ratio may be from 0.05 to 0.10, for example. When the blending ratio is from 0.05 to 0.10, cycle endurance is expected to be improved.

(Graphite Particles)

The graphite particle according to the present embodiment includes graphite. For example, the graphite particle may consist essentially of graphite. The graphite may include artificial graphite, natural graphite, and the like. As long as it includes graphite, the graphite particle may include an additional component. For example, the graphite particle may include a surface film. The surface film may include amorphous carbon and/or the like, for example.

(First Graphite Particle)

The first graphite particle is, in other words, a large particle. The particle size of the first graphite particle is larger than that of the second graphite particle. The first graphite particle may be able to contribute to enhancing energy density, input-output properties, storage properties, and the like. The first graphite particle has a first number-based particle size distribution. $D_150$ is a D50 in the first particle size distribution. $D_150$ may be from 15 to 20 μm, for example.

(Second Graphite Particle)

The second graphite particle is, in other words, a small particle. The particle size of the second graphite particle is smaller than that of the first graphite particle. The second graphite particle may form conductive paths between the large particles. The second graphite particle may be able to contribute to improving cycle endurance. The second graphite particle has a second number-based particle size distribution. $D_250$ is a D50 in the second particle size distribution. $D_250$ may be from 5 to 9 μm, for example.

(Particle Size Ratio)

The "particle size ratio $(D_250/D_150)$" according to the present embodiment is determined by dividing the $D_250$ of the second graphite particle by the $D_150$ of the first graphite particle. The particle size ratio is 0.50 or less. When the particle size ratio is 0.50 or less, cycle endurance is expected to be enhanced. It may be because the small particles may easily enter the gaps between the large particles. The particle size ratio may be 0.45 or less, or may be 0.43 or less, or may be 0.41 or less, for example. The particle size ratio may be 0.39 or more, for example.

(Average Circularity)

The average circularity is the arithmetic mean of circularity. In the present embodiment, the average circularity of the second graphite particle $(R_2)$ is equal to or less than the average circularity of the first graphite particle $(R_1)$. That is, the relationship of "$R_2 \leq R_1$" is satisfied. With this, the contact points between the small particles and the large particles are less likely to be lost. The average circularity of the second graphite particle $(R_2)$ may be less than the average circularity of the first graphite particle $(R_1)$. That is, the relationship of "$R_2 < R_1$" may be satisfied.

The average circularity of the first graphite particle $(R_1)$ may be 0.94 or more, or may be 0.95 or more, or may be from 0.94 to 0.95, for example. The higher the average circularity of the first graphite particle $(R_1)$ is, the more enhanced the input-output properties are expected to be, for example. The average circularity of the second graphite particle $(R_2)$ may be 0.90 or more, or may be 0.92 or more, or may be less than 0.94, or may be from 0.90 to 0.92, for example.

(Standard Deviation of Circularity)

The standard deviation of circularity of the second graphite particle $(M_2)$ may be 0.08 or more, for example. When the standard deviation $(\sigma_2)$ is 0.08 or more, cycle endurance is expected to be enhanced. It may be because, when the circularity of the small particle varies to a certain degree, the contact points between the small particles and the large particles are less likely to be lost. The standard deviation $(\sigma_2)$ may be 0.15 or less, for example.

The standard deviation of circularity of the first graphite particle $(\sigma_1)$ may be 0.05 or less, for example. The standard deviation $(\sigma_1)$ may be 0.03 or more, for example.

(Span Value)

The distribution of the first particle size distribution may be sharper than that of the second particle size distribution. More specifically, the span value of the first particle size distribution may be smaller than that of the second particle size distribution. With this, cycle endurance is expected to be improved.

$D_110$ is a D10 in the first particle size distribution. $D_190$ is a D90 in the first particle size distribution. For example, the span value of the first particle size distribution $[(D_190-D_110)/D_150]$ may be from 0.70 to 0.80.

$D_210$ is a D10 in the second particle size distribution. $D_290$ is a D90 in the second particle size distribution. The span value of the second particle size distribution $[(D_290-D_210)/D_250]$ may be 0.97 or more, or may be 1.05 or more, or may be from 0.97 to 1.05, for example.

The negative electrode active material (a mixture of the first graphite particle and the second graphite particle) has a third particle size distribution. $D_310$ is a D10 in the third particle size distribution. $D_350$ is a D50 in the third particle size distribution. $D_390$ is a D90 in the third particle size distribution.

The third particle size distribution may have a particular span value. More specifically, the third particle size distribution may have a span value $[(D_390-D_310)/D_350]$ from 0.87 to 0.99, for example. With this, cycle endurance is expected to be improved. The span value of the third particle size distribution may be from 0.89 to 0.99, for example.

(Optional Component)

As long as it includes the first graphite particle and the second graphite particle, the negative electrode active material may be prepared so as to include an additional component. For example, in addition to the first graphite particle and the second graphite particle, silicon (Si), silicon oxide (SiO), tin (Sn), tin oxide (SnO), $Li_4Ti_5O_{12}$, and/or the like may be mixed. The sum of the mass fractions of the first graphite particle and the second graphite particle in the negative electrode active material may be 50% or more, or may be 80% or more, or may be 90% or more, or may be 95% or more, or may be substantially 100%, for example. The sum of the mass fractions of the first graphite particle and the second graphite particle is determined by dividing the total mass of the first graphite particle and the second graphite particle by the total mass of the negative electrode active material.

《(B) Producing Negative Electrode》

The present production method includes producing a negative electrode including the negative electrode active material. The negative electrode may be produced by any method. For example, the negative electrode may be produced by slurry application. For example, the negative electrode active material, a binder, and a dispersion medium may be mixed to prepare a slurry. For the slurry preparation, a stirrer, a dispersing apparatus, and/or the like may be optionally used. The solid matter of the slurry may include the negative electrode active material and the binder, for example. For example, the solid matter of the slurry may consist essentially of the binder in a mass fraction from 0.1 to 10% and the remainder being made up of the negative electrode active material. The slurry may have a solid content from 40 to 80%, for example. The "solid content" refers to the sum of the mass fractions of all the components other than the dispersion medium.

The binder may include an optional component. The binder may include at least one selected from the group consisting of sodium carboxymethylcellulose (CMC-Na) and styrene-butadiene rubber (SBR), for example. The dispersion medium may be selected as appropriate depending on, for example, the type of the binder. The dispersion medium may include water and/or the like, for example.

Figure 2:
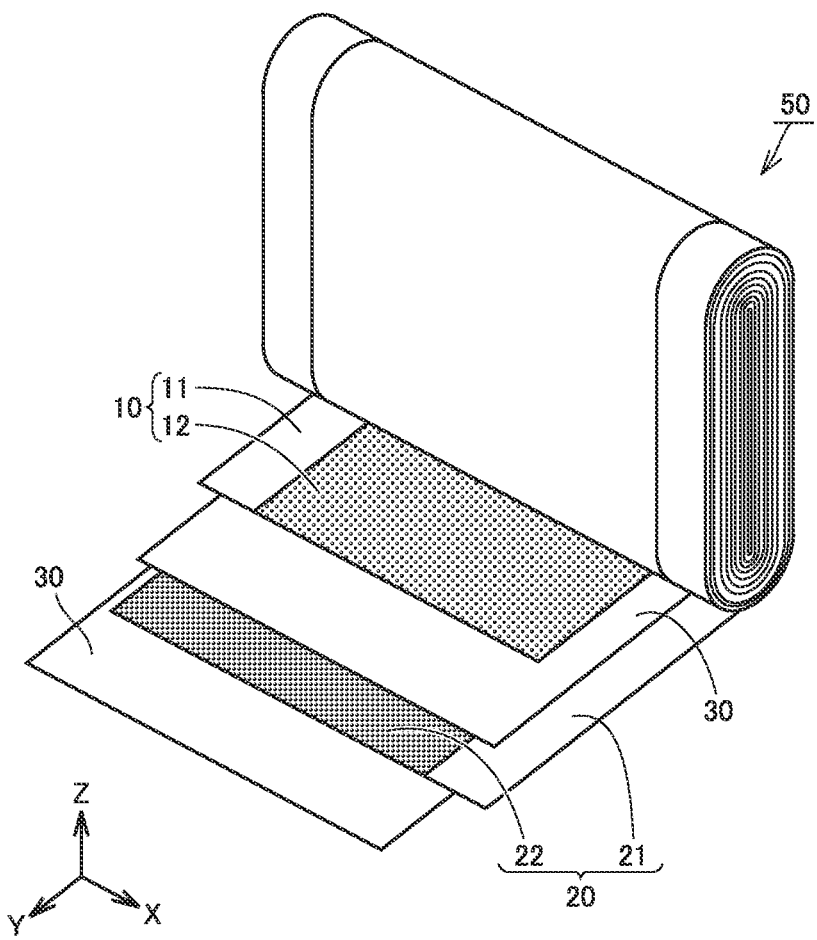
FIG. 2 is a schematic view illustrating an example configuration of an electrode assembly according to the present embodiment.

FIG. 2 is a schematic view illustrating an example configuration of an electrode assembly according to the present embodiment.

For example, a negative electrode substrate 21 may be prepared. Negative electrode substrate 21 may include copper (Cu) foil and/or the like, for example. Negative electrode substrate 21 may have a thickness from 5 to 30 μm, for example. A slurry is applied to a surface of negative electrode substrate 21, followed by drying, and thereby a negative electrode active material layer 22 may be formed. In the present embodiment, an applicator may be optionally used. Negative electrode active material layer 22 may be formed on only one side of negative electrode substrate 21, or may be formed on both sides of it. Negative electrode active material layer 22 may be formed in a manner such that a part of negative electrode substrate 21 is exposed. The part of negative electrode substrate 21 thus exposed may be worked on for current collecting and/or the like, for example. In this way, a negative electrode raw sheet is produced.

The negative electrode raw sheet may be formed into a predetermined shape that depends on the configuration of an electrode assembly 50. For example, a rolling mill and/or the like may be used to compress negative electrode active material layer 22. Negative electrode active material layer 22 after compression may have a thickness from 10 to 200 μm, for example. Negative electrode active material layer 22 after compression may have a density from 0.8 to 1.6 g/cm$^3$, for example. The negative electrode raw sheet may be cut with the use of a slitter and/or the like, for example. The negative electrode raw sheet may be cut into a belt shape, for example. In this way, a negative electrode 20 may be produced.

«(C) Producing Battery»

Figure 3:
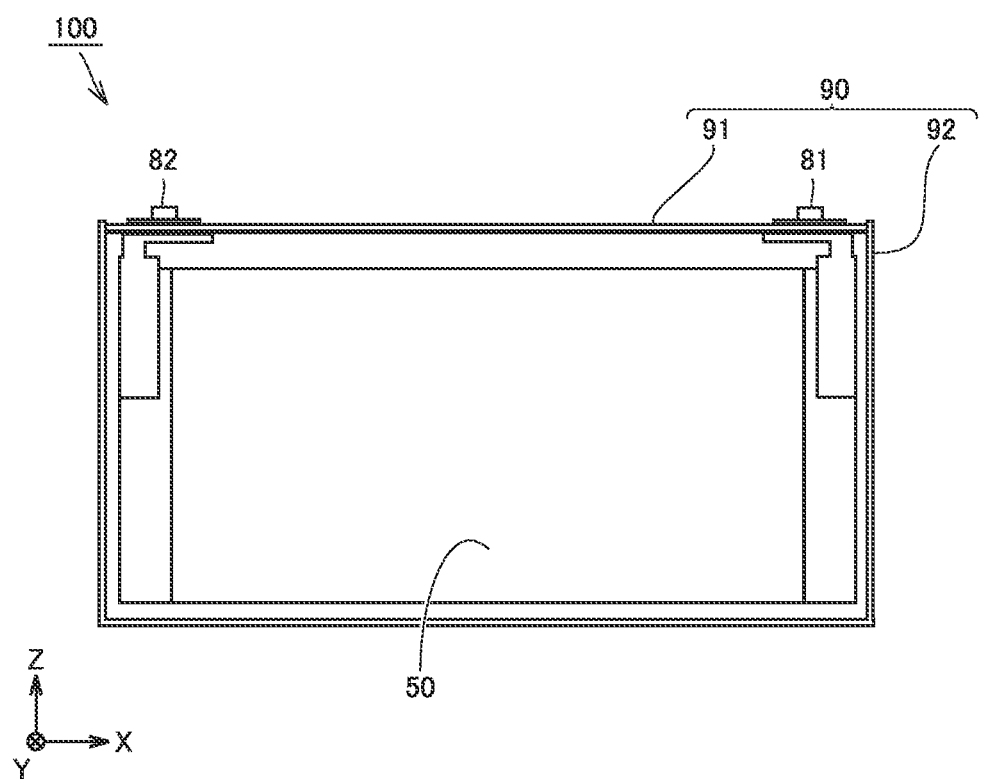
FIG. 3 is a schematic view illustrating an example configuration of a non-aqueous electrolyte secondary battery according to the present embodiment.

FIG. 3 is a schematic view illustrating an example configuration of a non-aqueous electrolyte secondary battery according to the present embodiment.

The present production method includes producing a battery 100 including negative electrode 20, a positive electrode 10, and an electrolyte solution (not illustrated).

(Positive Electrode)

The present production method includes preparing positive electrode 10 (see FIG. 2). Positive electrode 10 may be prepared by any method. For example, in the same manner as for negative electrode 20, positive electrode 10 may be produced by slurry application. Positive electrode 10 includes a positive electrode substrate 11 and a positive electrode active material layer 12. Positive electrode substrate 11 may include aluminum (Al) foil and/or the like, for example. Positive electrode substrate 11 may have a thickness from 10 to 30 μm, for example. Positive electrode active material layer 12 is formed on the surface of positive electrode substrate 11. Positive electrode active material layer 12 may be formed on only one side of positive electrode substrate 11, or may be formed on both sides of it. Positive electrode active material layer 12 may have a thickness from 10 to 200 μm, for example. Positive electrode active material layer 12 may include a positive electrode active material, a conductive material, and a binder, for example. For example, positive electrode active material layer 12 may consist essentially of the binder in a mass fraction from 0.1 to 10%, the conductive material in a mass fraction from 0.1 to 10%, and the remainder being made up of the positive electrode active material.

The positive electrode active material may include an optional component. The positive electrode active material may include, for example, at least one selected from the group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. Here, in a composition formula such as "$Li(NiCoMn)O_2$", for example, the constituents inside the parentheses are collectively regarded as a single unit in the entire composition ratio (Ni+Co+Mn=1). As long as (NiCoMn) is collectively regarded as a single unit in the entire composition ratio, the composition ratios between the elements (Ni, Co, Mn) are not particularly limited. The conductive material may include an optional component. The conductive material may include carbon black and/or the like, for example. The binder may include an optional component. The binder may include polyvinylidene difluoride (PVdF) and/or the like, for example.

(Electrode Assembly)

The present production method includes forming electrode assembly 50 (see FIG. 2). Electrode assembly 50 may have any configuration. For example, electrode assembly 50 may be a stack-type one, or may be a wound-type one. For example, a separator 30 is prepared. One separator 30 may be used, or two separators 30 may be used. For example, separator 30, negative electrode 20, separator 30, and positive electrode 10 may be stacked in this order to form a stack. The stack may be spirally wound to form electrode assembly 50. Electrode assembly 50 may be shaped into a flat form, for example.

(Separator)

Separator 30 is a porous sheet. Separator 30 allows for permeation of the electrolyte solution therethrough. Separator 30 may have an air permeability from 100 to 400 s/100 mL, for example. The "air permeability" herein refers to the "air resistance" defined by "JIS P 8117:2009". The air permeability may be measured by a Gurley test method.

Separator 30 is electrically insulating. Separator 30 may include a polyolefin-based resin and/or the like, for example. Separator 30 may consist essentially of a polyolefin-based resin, for example. The polyolefin-based resin may include, for example, at least one selected from the group consisting of polyethylene (PE) and polypropylene (PP). Separator 30 may have a monolayer structure, for example. Separator 30 may consist essentially of a PE layer, for example Separator 30 may have a multilayer structure, for example. Separator 30 may be formed by stacking a PP layer, a PE layer, and a PP layer in this order, for example. On a surface of separator 30, a heat-resistant layer (such as a ceramic particle layer) may be formed, for example.

(Housing)

A housing 90 is prepared (see FIG. 3). Housing 90 may have any configuration. Housing 90 may be a container made of Al alloy, or may be a pouch made of Al-laminated film, for example. Housing 90 may be prismatic, or may be cylindrical, for example.

Housing 90 may include a sealing plate 91 and an exterior can 92, for example. Sealing plate 91 may have a positive electrode terminal 81 and a negative electrode terminal 82. To positive electrode terminal 81 and negative electrode terminal 82, electrode assembly 50 is connected. Electrode assembly 50 is placed in exterior can 92. Sealing plate 91 and exterior can 92 are bonded together by laser beam welding, for example. Sealing plate 91 may have an inlet (not illustrated). Through the inlet, the electrolyte solution may be injected into housing 90. Electrode assembly 50 may be impregnated with the electrolyte solution. After the electrolyte solution is injected, the inlet is closed to hermetically seal housing 90. In this way, battery 100 may be produced.

Battery 100 may have a rated capacity from 1 to 400 Ah, for example. Battery 100 may be used for any purpose of use. Battery 100 may be used as a main electric power supply or a motive force assisting electric power supply in an electric vehicle and/or the like. A plurality of batteries 100 may be connected together to form a battery module or a battery pack.

(Electrolyte Solution)

The electrolyte solution is a liquid electrolyte. As long as the electrolyte solution is used, a gelled electrolyte and/or the like may be formed, for example. The electrolyte solution includes a solvent and a supporting electrolyte. The solvent is aprotic. The solvent may include an optional component. The solvent may include, for example, at least one selected from the group consisting of ethylene carbonate (EC), propylene carbonate (PC), butylene carbonate (BC), dimethyl carbonate (DMC), ethyl methyl carbonate (EMC), diethyl carbonate (DEC), 1,2-dimethoxyethane (DME), methyl formate (MF), methyl acetate (MA), methyl propionate (MP), and γ-butyrolactone (GBL).

The supporting electrolyte is dissolved in the solvent. The supporting electrolyte may include, for example, at least one selected from the group consisting of $LiPF_6$, $LiBF_4$, and $LiN(FSO_2)_2$. The supporting electrolyte may have a molarity from 0.5 to 2.0 mol/L, or may have a molarity from 0.8 to 1.2 mol/L, for example.

In addition to the solvent and the supporting electrolyte, the electrolyte solution may further include an optional additive. For example, the electrolyte solution may include an additive in a mass fraction from 0.01 to 5%. The additive may include, for example, at least one selected from the group consisting of vinylene carbonate (VC), lithium difluorophosphate ($LiPO_2F_2$), lithium fluorosulfonate ($FSO_3Li$), and lithium bis(oxalato)borate (LiBOB).

EXAMPLES

Next, examples according to the present technique (also called "the present example" herein) will be described. It should be noted that the below description does not limit the scope of the present technique.

By the following production methods according to No. 1 to 12, various test cells (pouch cells) were produced.

<No. 1>

«(A) Preparing Negative Electrode Active Material»

The below materials were prepared.

First graphite particle: graphite A (The powder properties are given in Table 1 below.)

Second graphite particle: graphite C (The powder properties are given in Table 1 below.)

95 parts by mass of the first graphite particle and 5 parts by mass of the second graphite particle were mixed to prepare a negative electrode active material. That is, the blending ratio ($M_2/M_1$) is 0.05. The powder properties (the span value) of the negative electrode active material are given in Table 1 below.

«(B) Producing Negative Electrode»

The below materials were prepared.

Binder: CMC-Na, SBR

Dispersion medium: water

Negative electrode substrate: Cu foil 100 parts by mass of the negative electrode active material, 0.7 parts by mass of CMC-Na, 1 part by mass of SBR, and a proper amount of the dispersion medium were mixed to prepare a slurry. The slurry was applied to a surface of the negative electrode substrate to form a negative electrode active material layer. The negative electrode active material layer was dried. A rolling mill was used to compress the negative electrode active material layer. Thus, a negative electrode raw sheet was produced. The negative electrode raw sheet was cut into a belt shape to produce a negative electrode.

«(C) Producing Battery»

The below materials were prepared.

Positive electrode active material: $Li(NiCoMn)O_2$

Conductive material: acetylene black

Binder: PVdF

Dispersion medium: N-methyl-2-pyrrolidone

Positive electrode substrate: Al foil 97.5 parts by mass of the positive electrode active material, 1 part by mass of the conductive material, 1.5 parts by mass of the binder, and a proper amount of the dispersion medium were mixed to prepare a slurry. The slurry was applied to a surface of the positive electrode substrate to form a positive electrode active material layer. The positive electrode active material layer was dried. A rolling mill was used to compress the positive electrode active material layer. Thus, a positive electrode raw sheet was produced. The positive electrode raw sheet was cut into a belt shape to produce a positive electrode.

A separator made of PP was prepared. The separator had a monolayer structure. To each of the positive electrode and the negative electrode, a lead tab was bonded. The positive electrode, the separator, and the negative electrode were stacked in this order to form a stack. The stack was spirally wound to form an electrode assembly.

A housing was prepared. The housing was a pouch made of Al-laminated film. Into the housing, the electrode assembly was placed. An electrolyte solution was prepared. The electrolyte solution consisted of the components described below.

Solvent: "EC/EMC=3/7 (volume ratio)"

Supporting electrolyte: $LiPF_6$ (1.0 mol/L)

Additive: VC (volume fraction, 2%)

The electrolyte solution was injected into the housing. After the electrolyte solution was injected, the housing was hermetically sealed with the use of a heat sealer. Thus, a test cell was produced.

<No. 2>

A test cell was produced in the same manner as in the production method according to No. 1 except that graphite B was used as a first graphite particle instead of graphite A. The powder properties of graphite B are given in Table 1 below.

<No. 3>

A test cell was produced in the same manner as in the production method according to No. 1 except that the blending ratio ($M_2/M_1$) was changed to 0.10

<No. 4>

A test cell was produced in the same manner as in the production method according to No. 1 except that graphite G was used as a first graphite particle instead of graphite A. The powder properties of graphite G are given in Table 1 below.

<No. 5>

A test cell was produced in the same manner as in the production method according to No. 1 except that graphite F was used as a second graphite particle instead of graphite C. The powder properties of graphite F are given in Table 1 below.

<No. 6>

A test cell was produced in the same manner as in the production method according to No. 5 except that graphite B was used as a first graphite particle instead of graphite A.

<No. 7>

A test cell was produced in the same manner as in the production method according to No. 1 except that the blending ratio ($M_2/M_1$) was changed to 0.025.

<No. 8>

A test cell was produced in the same manner as in the production method according to No. 1 except that the blending ratio ($M_2/M_1$) was changed to 0.125.

<No. 9>

A test cell was produced in the same manner as in the production method according to No. 1 except that graphite D was used as a second graphite particle instead of graphite C. The powder properties of graphite D are given in Table 1 below.

<No. 10>

A test cell was produced in the same manner as in the production method according to No. 1 except that graphite F was used as a second graphite particle instead of graphite C. The powder properties of graphite E are given in Table 1 below.

<No. 11>

A test cell was produced in the same manner as in the production method according to No. 2 except that graphite D was used as a second graphite particle instead of graphite C.

<No. 12>

A test cell was produced in the same manner as in the production method according to No. 1 except that the blending ratio ($M_2/M_1$) was changed to 0. In other words, the negative electrode active material according to No. 12 consists of a first graphite particle (graphite A)

<Evaluation>

In an environment at a temperature of 25° C., 200 cycles of charge and discharge were carried out. A single cycle consisted of a single sequence of charge and discharge as specified below.

By constant-current charging at ⅓ It, the test cell is charged to 4.25 V. Subsequently, the test cell is charged by constant-voltage charging at 4.25 V until the current is attenuated to reach ¹/₂₀ It. After the completion of the charging, the test cell is discharged to 3.0 V by constant-current discharging at ⅓ It. "1 It" is defined as the current at which complete discharge of the test cell from the rated capacity completes in one hour.

The discharged capacity of the 200th cycle was divided by the discharged capacity of the 1st cycle to determine the capacity retention at the 200th cycle. The capacity retention is represented in percentage. The higher the capacity retention is, the better the cycle endurance is considered to be.

TABLE 1

| No. | First graphite particle | | | Second graphite particle | | | | Negative electrode active material (First graphite particle + Second graphite particle) | | | Evaluation Cycle endurance |
|---|---|---|---|---|---|---|---|---|---|---|---|
| | Type | Arithmetic mean of circularity $R_2$ | Span value $(D_190 - D_110)/D_150$ | Type | Arithmetic mean of circularity $R_2$ | Standard deviation of circularity $\sigma_2$ | Span value $(D_290 - D_210)/D_250$ | Particle size ratio $D_250 - D_150$ | Blending ratio $M_2/M_1$ | Span value $(D_390 - D_310)/D_350$ | Capacity retention @200 cyc |
| 1 | A | 0.94 | 0.80 | C | 0.90 | 0.08 | 0.97 | 0.45 | 0.05 | 0.89 | 98.2% |
| 2 | B | 0.95 | 0.70 | C | 0.90 | 0.08 | 0.97 | 0.41 | 0.05 | 0.87 | 98.9% |
| 3 | A | 0.94 | 0.80 | C | 0.90 | 0.08 | 0.97 | 0.45 | 0.10 | 0.99 | 98.7% |
| 4 | G | 0.90 | 0.85 | C | 0.90 | 0.08 | 0.97 | 0.45 | 0.05 | 0.94 | 97.2% |
| 5 | A | 0.94 | 0.80 | F | 0.92 | 0.05 | 1.05 | 0.43 | 0.05 | 0.90 | 93.0% |
| 6 | B | 0.95 | 0.70 | F | 0.92 | 0.05 | 1.05 | 0.39 | 0.05 | 0.88 | 93.7% |
| 7 | A | 0.94 | 0.80 | C | 0.90 | 0.08 | 0.97 | 0.45 | 0.025 | 0.84 | 94.4% |
| 8 | A | 0.94 | 0.80 | C | 0 90 | 0 08 | 0.97 | 0.45 | 0.125 | 1.04 | 90.3% |
| 9 | A | 0.94 | 0.80 | D | 0.92 | 0.05 | 0.97 | 0.68 | 0.05 | 0.72 | 68.1% |
| 10 | A | 0.94 | 0.80 | E | 0.92 | 0.05 | 0.88 | 0.57 | 0.05 | 0.86 | 66.2% |
| 11 | B | 0.95 | 0.70 | D | 0.92 | 0.05 | 0.97 | 0.62 | 0.05 | 0.71 | 89.6% |
| 12 | A | 0.94 | 0 80 | — | — | — | — | — | 0 | 0.80 | 73.0% |

<Results>

The cycle endurance of each of the test cells produced by the production methods according to Nos. 1 to 8 is better than that of the test cells produced by the production methods according to Nos. 9 to 12. In the production method according to Nos. 1 to 8, the relationships of "$D_250/D_150 \leq 0.50$" and "$R_2 \leq R_1$" are satisfied.

When the relationship of "$0.05 \leq M_2/M_1 \leq 0.10$" is satisfied, cycle endurance tends to be improved (see Nos. 1, 3, 7, 8).

When the relationships of "$0.70 \leq (D_190-D_110)/D_150 \leq 0.80$" and "$0.97 \leq (D_290-D_210)/D_250$" are satisfied, cycle endurance tends to be improved (see Nos. 1, 3, 4).

When the relationship of "$0.08 \leq \sigma_2$" is satisfied, cycle endurance tends to be improved (see Nos. 1, 2, 5, 6).

When the relationship of "$0.87 \leq (D_390-D_310)/D_350 \leq 0.99$" is satisfied, cycle endurance tends to be improved (see Nos. 1 to 3, 7, 8).

The present embodiment and the present example are illustrative in any respect. The present embodiment and the present example are non-restrictive. The scope of the present technique encompasses any modifications within the meaning and the scope equivalent to the terms of the claims. For example, it is expected that certain configurations of the present embodiments and the present examples can be optionally combined.

What is claimed is:

1. A method of producing a non-aqueous electrolyte secondary battery, comprising:
preparing a negative electrode active material by mixing a first graphite particle and a second graphite particle;
producing a negative electrode including the negative electrode active material; and
producing a non-aqueous electrolyte secondary battery including the negative electrode, a positive electrode, and an electrolyte solution, wherein
a blending ratio, $M_2/M_1$, of the second graphite particle to the first graphite particle is from 0.025 to 0.125, where $M_1$ is a mass of the first graphite particle included in the negative electrode active material and where $M_2$ is a mass of the second graphite particle included in the negative electrode active material,
the first graphite particle has a first number-based particle size distribution,
the second graphite particle has a second number-based particle size distribution, and
a relationship of an expression (I):

$$D_250/D_150 \leq 0.50 \quad \text{(I)}$$

is satisfied, where
$D_150$ is a D50 in the first number-based particle size distribution, and
$D_250$ is a D50 in the second number-based particle size distribution, and
relationships of expressions (II), (III) and (IV):

$$R_2 \leq R_1 \quad \text{(II)}$$

$$0.94 \leq R_1 \quad \text{(III)}$$

$$0.90 \leq R_2 \leq R_1 \quad \text{(IV)}$$

are satisfied, where
$R_1$ is an arithmetic mean of circularity of the first graphite particle, and
$R_2$ is an arithmetic mean of circularity of the second graphite particle.

2. The method of producing a non-aqueous electrolyte secondary battery according to claim 1, wherein a relationship of expression (V):

$$0.05 \leq M_2/M_1 \leq 0.10 \quad \text{(V)}$$

is satisfied.

3. The method of producing a non-aqueous electrolyte secondary battery according to claim 1, wherein
a relationship of an expression (VI):

$$0.70 \leq (D_190 - D_110)/D_150 \leq 0.80 \quad \text{(VI)}$$

is satisfied, where
$D_110$ is a D10 in the first number-based particle size distribution, and
$D_190$ is a D90 in the first number-based particle size distribution, and
a relationship of an expression (VII):

$$0.97 \leq (D_290 - D_210)/D_250 \quad \text{(VII)}$$

is satisfied, where
$D_210$ is a D10 in the second number-based particle size distribution, and
$D_290$ is a D90 in the second number-based particle size distribution.

4. The method of producing a non-aqueous electrolyte secondary battery according to claim 1, wherein a standard deviation of circularity of the second graphite particle is 0.08 or more.

5. The method of producing a non-aqueous electrolyte secondary battery according to claim 1, wherein
a mixture of the first graphite particle and the second graphite particle has a third number-based particle size distribution, and
a relationship of an expression (VIII):

$$0.87 \leq (D_390 - D_310)/D_350 \leq 0.99 \quad \text{(VIII)}$$

is satisfied, where
$D_310$ is a D10 in the third number-based particle size distribution,
$D_350$ is a D50 in the third number-based particle size distribution, and
$D_390$ is a D90 in the third number-based particle size distribution.

6. The method of producing a non-aqueous electrolyte secondary battery according to claim 1, wherein a sum of mass fractions of the first graphite particle and the second graphite particle with respect to a total mass of the negative electrode active material is 80% or more.

7. The method of producing a non-aqueous electrolyte secondary battery according to claim 1, wherein a sum of mass fractions of the first graphite particle and the second graphite particle with respect to a total mass of the negative electrode active material is 90% or more.

8. The method of producing a non-aqueous electrolyte secondary battery according to claim 1, wherein a sum of mass fractions of the first graphite particle and the second graphite particle with respect to a total mass of the negative electrode active material is 95% or more.

9. The method of producing a non-aqueous electrolyte secondary battery according to claim 1, wherein the negative electrode active material consists essentially of a mixture of the first graphite particle and the second graphite particle.

* * * * *